Jan. 7, 1936.  H. W. HELMS  2,027,098
HOIST FOR SEMITRAILERS
Filed April 8, 1932    4 Sheets-Sheet 1
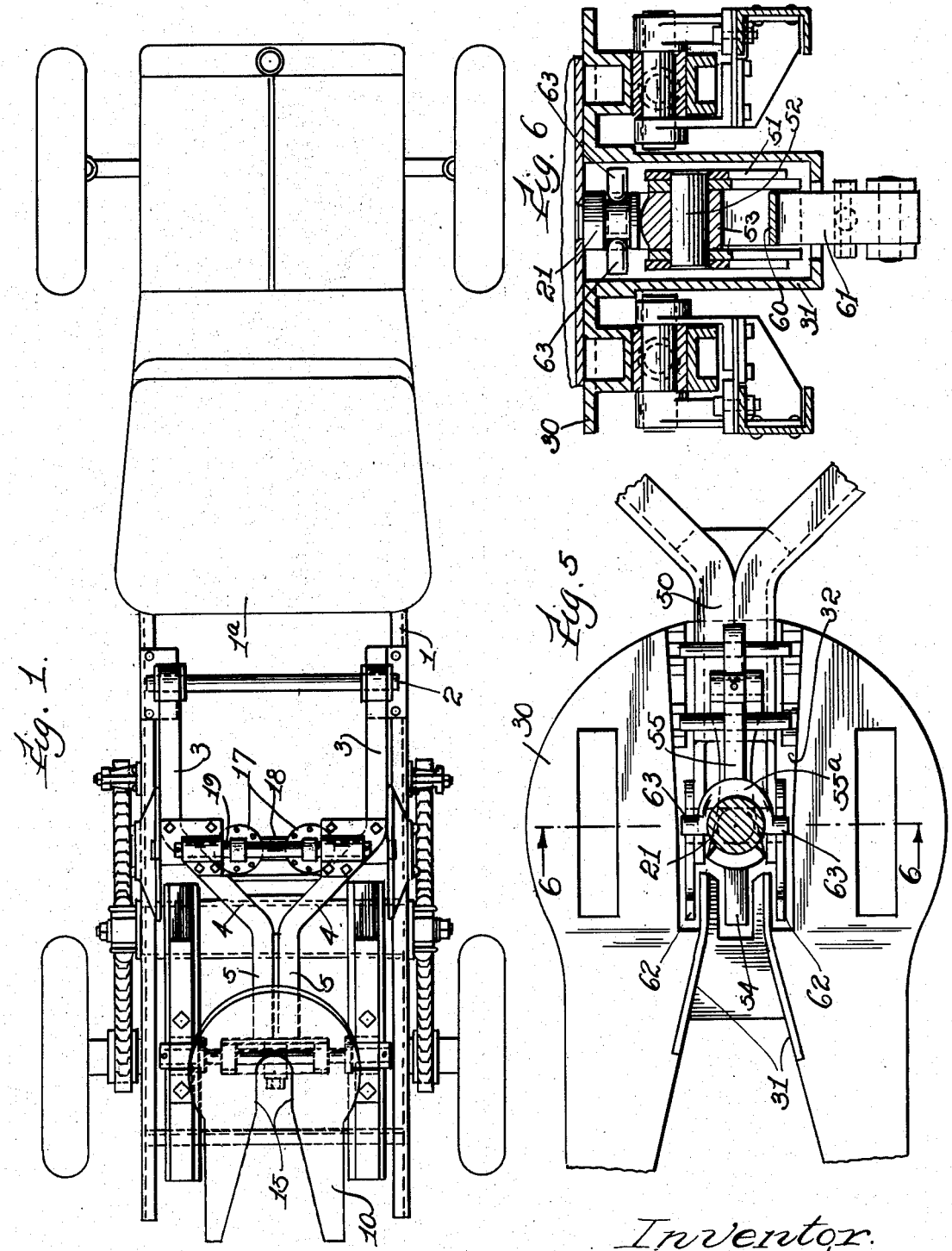
Inventor.
Harry W. Helms.
by [signature]
his Attorneys.
Witness
H. F. McKnight Jan. 7, 1936.  H. W. HELMS  2,027,098
HOIST FOR SEMITRAILERS
Filed April 8, 1932  4 Sheets-Sheet 2
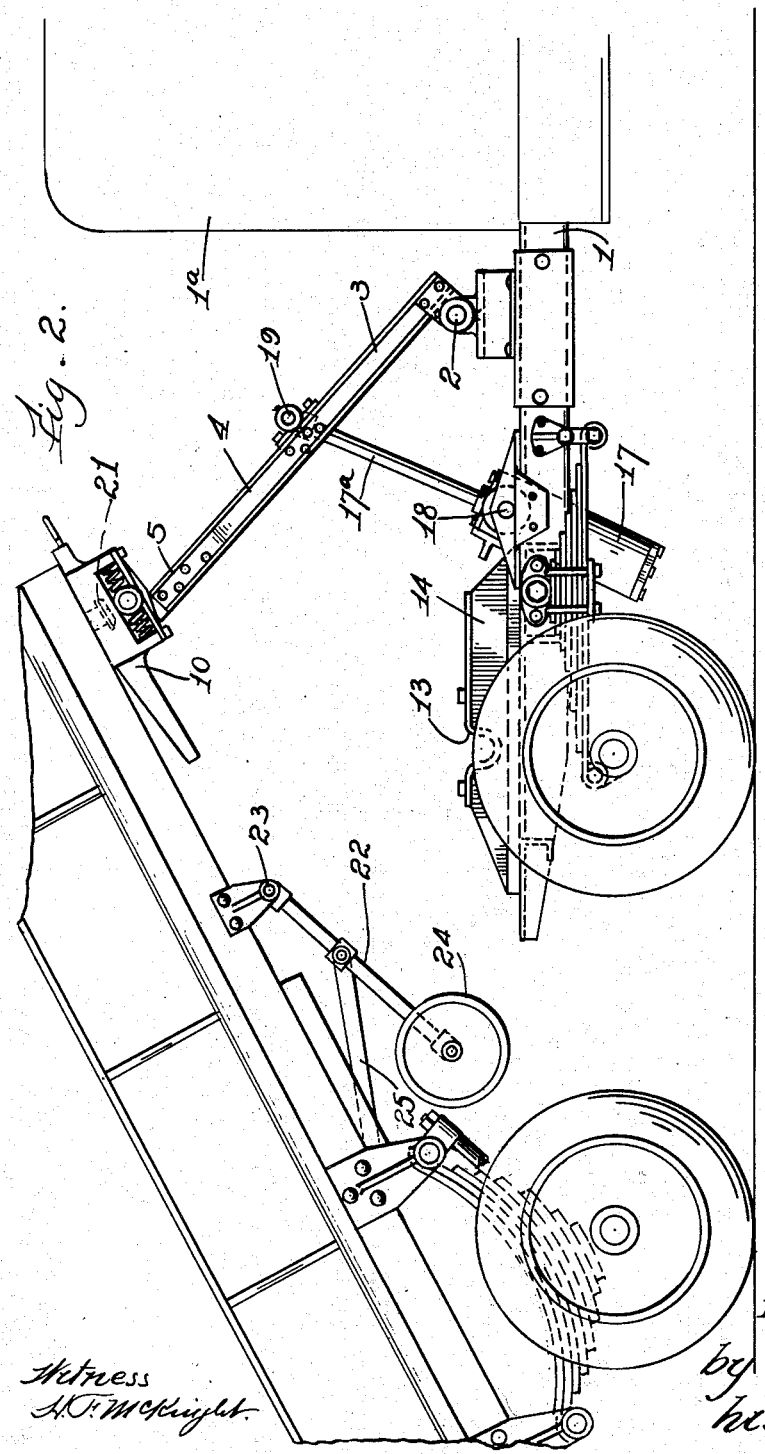
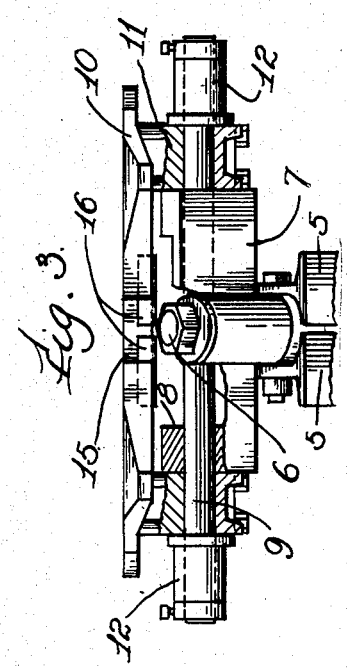

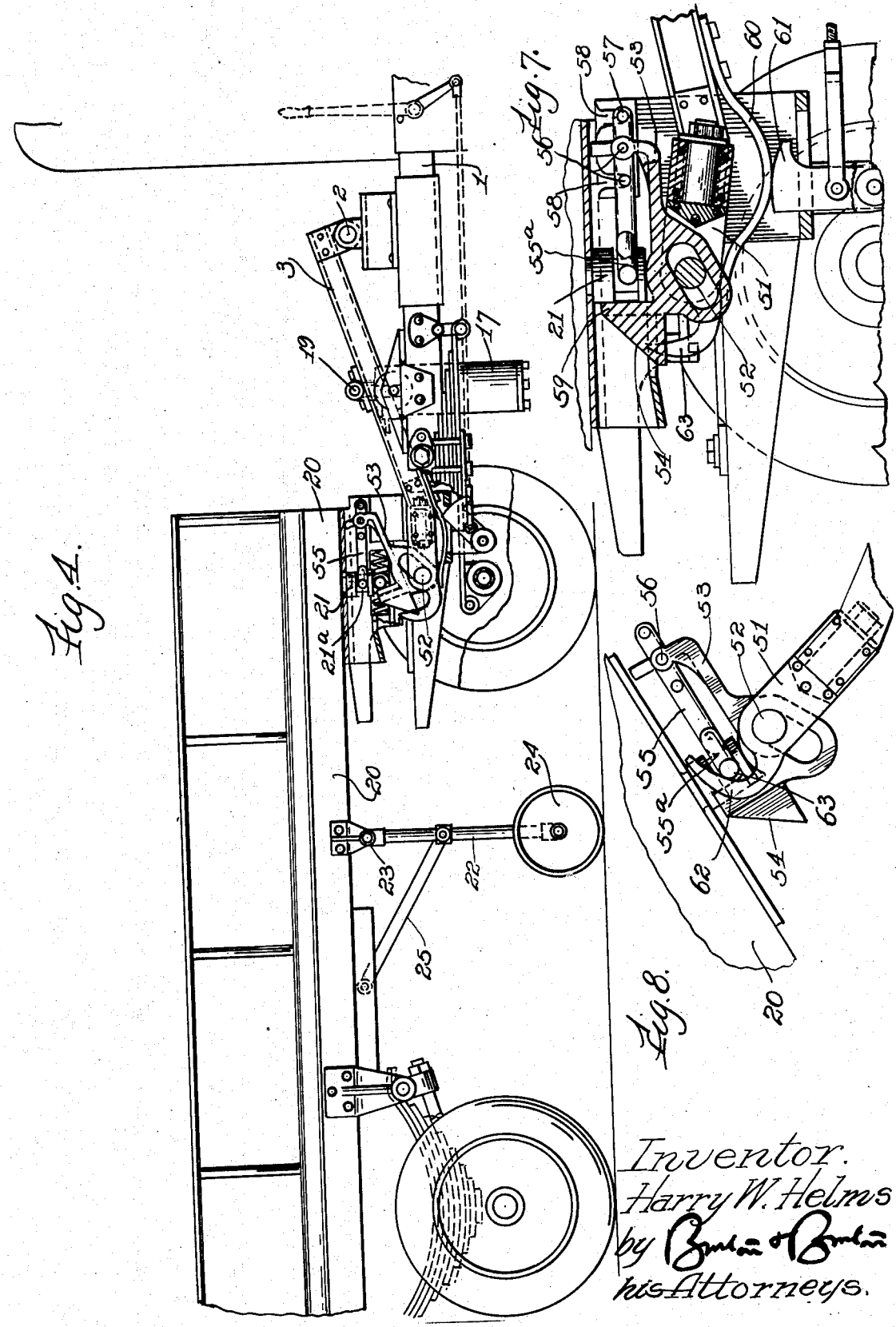

Jan. 7, 1936.  H. W. HELMS  2,027,098
HOIST FOR SEMITRAILERS
Filed April 8, 1932  4 Sheets-Sheet 4
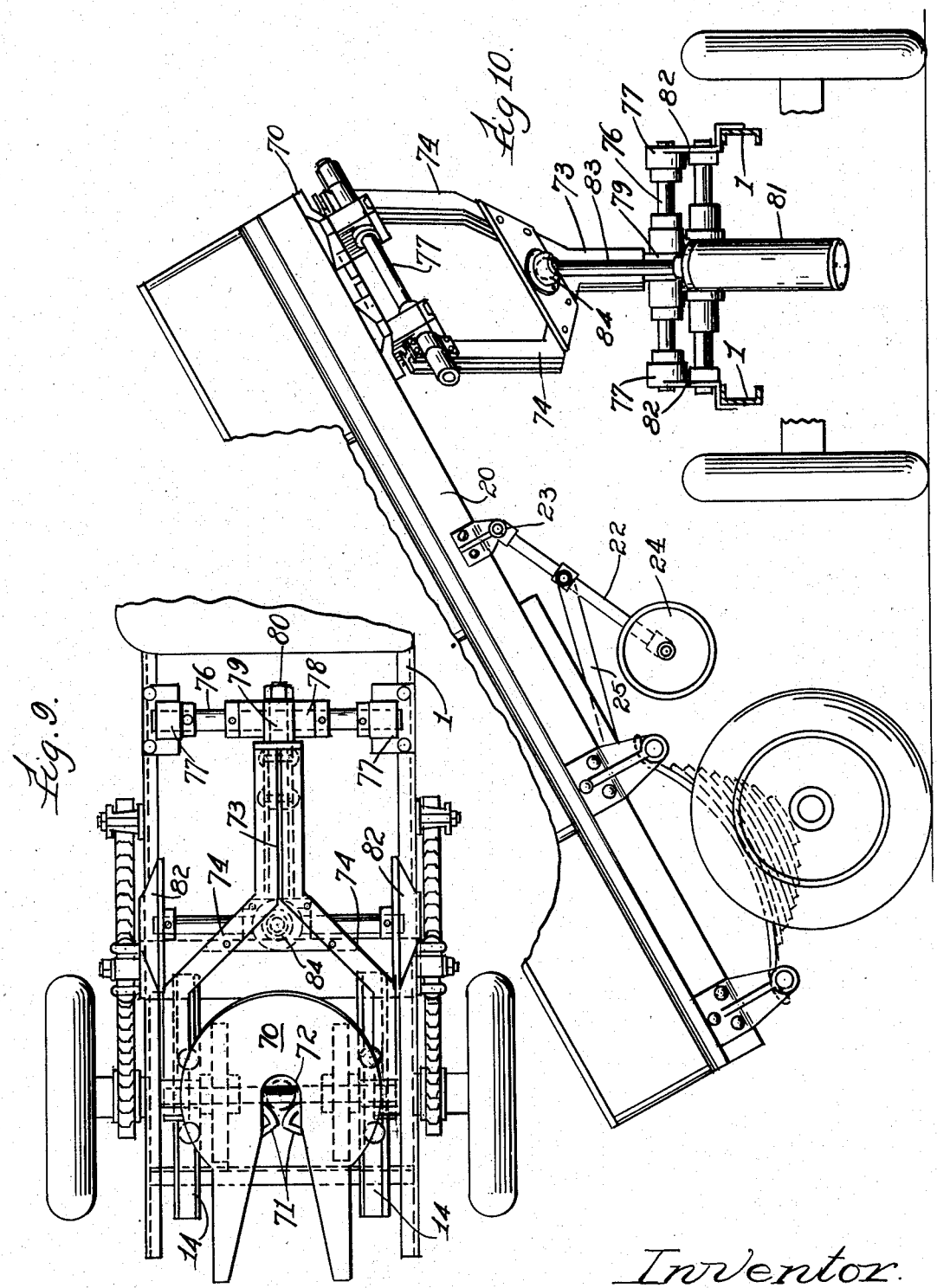
Inventor.
Harry W. Helms.
by [signature]
his Attorneys.

Patented Jan. 7, 1936

2,027,098

UNITED STATES PATENT OFFICE 2,027,098

HOIST FOR SEMITRAILERS

Harry W. Helms, Detroit, Mich., assignor to Highway Trailer Company, Edgerton, Wis., a corporation of Wisconsin Application April 8, 1932, Serial No. 603,963

6 Claims. (Cl. 298—22)

The purpose of this invention is to provide mechanism on a tractor vehicle adapted for tilting the body of a semi-trailer coupled thereto for dumping the load, and an object of the invention is to simplify the construction by utilizing the same connection for attaching the semi-trailer to the dumping or lifting mechanism and for coupling the semi-trailer to the tractor vehicle. It consists in the combination as herein shown and described, and as indicated by the claims.

In the drawings:

Figure 1 is a plan view of a tractor vehicle fitted with a power hoist adapted for lifting the semi-trailer body for dumping its load in accordance with this invention.

Figure 2 is a partial side elevation of a tractor and trailer showing the dumping mechanism in operation.

Figure 3 is a detail view, being a front elevation partly in section, of the lower fifth wheel and its mounting on the hoisting arm.

Figure 4 is a partial side elevation of a tractor and semi-trailer embodying a modified form of hoisting mechanism and coupler.

Figure 5 is a plan view of the lower fifth wheel and coupling means employed in the structure of Figure 4.

Figure 6 is a vertical section taken as indicated at line 6—6 on Figure 5.

Figure 7 is a vertical section on a larger scale than Figure 4, showing the coupling connections of that structure with some parts in section.

Figure 8 is a detail view indicating the operation of the coupler shown in Figures 4 to 7 during the dumping action.

Figure 9 is a partial plan view of a tractor unit fitted with modified form of hoisting and coupling means.

Figure 10 is a side elevation of a trailer and a somewhat diagrammatic transverse view of a portion of the tractor showing said modified device in operation.

In the structure which is the subject of this invention, the mounting of the hoist or lifting mechanism on the tractor vehicle instead of on the chassis of a trailer permits of a simpler and cheaper construction for the trailer itself, and allows the same hoisting mechanism to serve several trailers used interchangeably with a single tractor. It also permits the owner of a tractor to use it with an assortment of trailers designed for various purposes, among which assortment there may be only one trailer constructed with a dumping body.

As shown in Figures 1 to 3, the frame, 1, of the motor truck has fulcrumed upon it at 2 a hoisting arm, 3, which, as shown in Figure 1, is composed of two members, 3, 3, spaced apart laterally at the fulcrum axis, 2, but bent so as to converge at 4 with parallel terminal portions, 5, 5, extending close together and supporting a pivot or trunnion, 6. A yoke, 7, carried by the pivot, 6, extends laterally in both directions therefrom and is formed with upstanding lugs or ears, 8, through which a pivot shaft, 9, passes for connecting to the hoisting arm the lower fifth wheel member, 10. Said member is formed on its under side with depending lugs, 11, engaging the pivot shaft, 9, and the ends of the shaft are fitted with collars, 12, which are cradled normally in the upwardly open notches, 13, of carrying blocks, 14, secured to the rear portion of the tractor frame. When the hoisting arm is raised as shown in Figure 2, the collared ends of the pivot shaft, 9, are lifted out of the notches, 13, and the fifth wheel, 10, is carried up bodily, remaining coupled to the frame, 20, of the trailer. This frame carries the usual depending king pin, seen in dotted outline at 21 in Figure 2. As shown in dotted outline in Figure 1, the lower fifth wheel, 10, is formed with a rearwardly open slot, 15, through which the king pin, 21, is entered in coupling the tractor and trailer, and in which slot it is held captive by suitable locking dogs, not shown in detail, but indicated at 16 in Figure 3. This construction may be substantially like that of the Martin and Farr Patent No. 1,412,025, dated April 4, 1922.

The up and down movements of the hoisting arms, 3, 3, may be controlled by any suitable power mechanism; that shown comprises a pair of hydraulic cylinders, 17, 17, carried on trunnions, 18, on the frame, 1, of the motor truck, and having piston rods, 17ª, extending to a transverse pivot shaft, 19, by which they are connected to the arms, 3, 3, as shown in Figure 1. Control of the hydraulic hoist may be accomplished by any suitable mechanism, preferably located in the driver's cab, 1ª, of the motor truck.

In order to permit uncoupling of the trailer from the tractor it is provided with the usual temporary support, 22, hinged to the frame 20 at 23, and fitted with road-engaging wheels, 24. An adjustable strut, 25, extends from the support, 22, for engagement with suitable mechanism at 26 on the under side of the frame, 20, to hold the support at either limit of its range of adjustment, that is, either swung up toward the under side of the frame, 20, as shown in Figure 2, or swung down into position for engagement of the wheels, 24, with the ground.

The connection of the fifth wheel member, 10, to the hoisting arms, 3, permits lateral rocking of the fifth wheel about the axis of the pivot, 6, and at the same time permits the trailer frame, 20, to assume any convenient angle by swinging about the trunnion-like connection which is provided by the pivot shaft, 9. The king pin, 21, of course permits swiveling action of the trailer frame with respect to the tractor in turning corners or traversing curved paths, and frequently it may be desirable to tilt the trailer to dumping position when the two vehicles are not in longitudinal alignment. This will be permitted by the combined pivotal action at the pivots, 6 and 9, which allows the lower fifth wheel, 10, to assume any required position which may result from the swiveling movement of the trailer about the king pin, 21, while the fifth wheel, 10, is held flatly in contact with the under surface of the upper turn table associated with the king pin.

Figures 4 to 8 show a modified construction in which the lower fifth wheel remains in position on the motor truck and is not elevated when the front end of the trailer is raised in dumping position. Instead, the fifth wheel is made as shown in Figure 5, consisting of two portions, 30, 30, having a rearwardly opening slot, 31, to receive the king pin for coupling, and having a forwardly opening slot or channel, 32, through which the outer end portions, 50, of the hoisting arms, may move vertically in engagement with the king pin, 21, itself. The construction of the trailer frame, 20, and the king pin which it carries, may be identical with that of Figure 2, and for purposes of illustration the same type of hydraulic hoisting cylinders is shown at 17 cooperating with lifting arms, 3, fulcrumed at 2 on the frame, 1, of the motor truck.

The supporting tables, 30, of the lower fifth wheel may be formed as integral parts of the same casting, being joined by a deep channel portion, 31, in which the outer ends, 50, of the lifting arms, 3, are accommodated when the parts are in normal traveling position. The ends, 50, of the arms are joined to a terminal, 51, carrying a pivot, 52, which supports a rockable socket member, 53, in which the king pin, 21, of the trailer is lodged in coupled position. The pivot, 52, permits the socket, 53, to change its angular relation to the lifting arms, 3, 3, when the hoist mechanism is operated to elevate the forward end of the trailer chassis, 20, and it also permits the rear end of the socket to be depressed by collision of its inclined cam surface, 54, with the king pin, 21, as the vehicles come together in the coupling operation.

In coupled relation the king pin is retained in the socket by engagement of a forked arm or yoke, 55, which is pivotally attached to the socket member, 53, at 56, so that it may swing vertically through a limited range with respect to the socket, 53. When the hoisting arm, 3, is at its lower limit, the yoke arm, 55, is held in horizontal position by engagement of its laterally extending lugs, 56 and 57, with the bottoms of notches or pockets, 58, in the sides of the channel, 31. The yoke portion, 55a, of the arm, 55, fits into the grooved or reduced portion, 21a, of the king pin and thus serves to check the king pin against upward movement out of the socket when the vehicles are traveling, and at the same time limits forward movement of the king pin, holding it captive against the upstanding rear wall, 59, of the socket member, 53. The terminal, 51, of the hoisting arm, and the socket, 53, which it carries, are yieldingly upheld in coupling position by means of a spring, 60, shown in Figure 7, attached to the under side of the hoisting arm and resting upon a rockable abutment, 61, fulcrumed upon any suitable support associated with the vehicle frame. Thus when the king pin encounters the sloping cam surface, 54, it momentarily depresses the socket, 53, and the end of the hoisting arm, but these parts are returned to their upper limiting position, as shown in Figure 7, by the resiliency of the spring, 60. To permit uncoupling of the vehicles it is only necessary to rock the abutment, 61, into non-supporting position with respect to the spring, 60, as shown in Figure 4, so that the terminal, 51, of the hoisting arm, and the socket, 53, may drop out of engagement with the king pin, 21, permitting the tractor to pull away from the trailer. It will be understood that the temporary support, 22, will have been lowered into operative position, as shown in Figure 4, before the vehicles are thus separated.

As indicated in Figure 8, the socket member, 53, swings about its pivot, 51, when the hoisting arm elevates the trailer chassis, 20, and body to dumping position. To forestall any possibility of the king pin, 21, escaping from the socket while the body is thus tilted up at the forward end, and the pivoted yoke arm, 55, is not checked against swinging about its pivot, 56, I provide a pair of hook-shaped extensions, 62, on the terminal, 51, to engage laterally extending lugs, 63, on the yoke, 55a. The change of angular relation between the socket, 53, and the terminal, 51, which occurs when the hoisting arm is lowered, carries the hooks, 62, out of engagement with the lugs, 63, as seen in Figure 4.

A further modification is shown in Figures 9 and 10 in which a fifth wheel, 70, of standard construction, with the usual locking jaws, 71, for the king pin, 72, of the upper bolster member, is carried at the rear end of the tractor frame, 1, and is arranged to be elevated by a hoisting arm, 73, of branched or Y-shape formation, with its branches, 74, extending respectively to opposite ends of the transverse shaft, 75, on which the fifth wheel, 70, is tiltably carried. Portions of this shaft, 75, rest normally in the upwardly open notches, 13, of blocks, 14, similar to those shown in Figure 2, while the extreme ends of the shaft connect the arms, 74, of the hoisting member. At the opposite end said member is pivoted for its vertical swinging movement by means of a rock shaft, 76, journaled in the bearings, 77, which are mounted on the side members of the frame, 1, respectively. A sleeve, 78, secured to the shaft, 76, at its middle portion serves as the connection between the shaft and the hoisting arm, and this sleeve is formed with a transverse bearing portion, 79, bored to receive a longitudinal pivot, 80, which is fixed in the frame or central portion of the Y-shape hoisting arm, 73.

The single hydraulic cylinder, 81, is trunnioned in the bearings, 82, on the side members of the frame, 1, and its piston, 83, is connected with the hoisting arm by a ball and socket joint, 84, substantially at the junction of the diverging branches, 74, with the stem portion of the arm, 73. This universal connection at 84, together with the longitudinal pivot, 80, permits the yoke to rock about the axis of said pivot in order to accommodate the position of the fifth wheel, 70, to any tilted or angular position of the trailer body, as for example, when the hoisting and dumping action takes place with the trailer standing at an angle to the tractor. Such a condition is illustrated in Figure 10, which is substantially a rear elevation of the tractor but assumes the trailer to be turned at right angles to the tractor and then tilted by the upward thrust of the piston, 83. It will be evident that the hoisting arm, 73, of this structure may be quite similar to that shown in Figure 1, being simply turned end for end, so that the transverse pivotal connection is made to the fifth wheel, 70, instead of to the frame, 1, while the longitudinal pivot is provided at 80 instead of at the connection to the fifth wheel, as in Figure 1.

I claim:

1. In combination, a tractor, a semi-trailer, a separable fifth wheel including a part on the tractor and a part on the trailer engageable and disengageable by relative substantially horizontal movement, and hoisting mechanism on the tractor including an arm fulcrumed on the tractor frame ahead of said fifth wheel and having its opposite end branched for engaging said fifth wheel at opposite sides, such engagement comprising pivotal connection between the lower fifth wheel and the branches of the arm at a transverse horizontal axis, the forward end of the arm being fulcrumed upon a parallel horizontal axis, and being also swivelly connected for twisting movement about an axis at right angles to said fulcrum axis substantially in the plane of its said branches.

2. In combination, a tractor, a semi-trailer, a separable fifth wheel connecting them, and a hoisting mechanism on the tractor comprising a hoisting arm fulcrumed on the tractor frame ahead of said fifth wheel, and having its rear end branched for pivotal connection with the fifth wheel at opposite sides along a transverse horizontal axis, means for applying power to said hoisting arm intermediate its fulcrum and its connection to the fifth wheel, and a universal pivotal connection between said arm and the tractor frame at the fulcrumed end of the arm permitting the fifth wheel to tilt laterally when elevated from the tractor by the hoisting arm.

3. In the combination defined in claim 2, said power means comprising a hydraulic cylinder with a ram projecting therefrom and a universal joint connecting the outer end of said ram with said hoisting arm substantially at the axis of said universal connection of the arm to the frame.

4. In combination, a tractor, a semi-trailer, a fifth wheel connecting them, and hoisting mechanism on the tractor including a hoisting arm fulcrumed on the tractor frame ahead of said fifth wheel, and having its free end remote from its fulcrum engaged with the fifth wheel, such engagement comprising a pivotal connection at a transverse horizontal axis, the arm being fulcrumed upon a substantially parallel horizontal axis and being also swivelly mounted for twisting movement about an axis substantially at right angles to said fulcrum axis.

5. In combination, a tractor, a semi-trailer, a fifth wheel connecting them, and hoisting mechanism on the tractor comprising a hoisting arm connected to the tractor frame ahead of said fifth wheel with its end remote from such connection pivotally secured to the fifth wheel along a transverse horizontal axis, means for applying power to said hoisting arm intermediate its connections to the frame and fifth wheel, the connection of said arm to the tractor frame being a universal pivotal fulcrum to permit the fifth wheel to be tilted laterally as well as about the aforesaid transverse axis when elevated from the tractor by the hoisting arm.

6. In the combination defined in claim 5, said power means including a ram and a universal joint connecting the outer end of said ram with said hoisting arm substantially at the axis of said universal connection of the arm to the frame.

HARRY W. HELMS.